United States Patent [19]
Kubota et al.

[11] Patent Number: 5,359,428
[45] Date of Patent: Oct. 25, 1994

[54] DIGITAL VIDEO RECORDER OPERABLE IN STANDARD AND LONG PLAY MODES

[75] Inventors: Yukio Kubota; Yoichirou Senshu, both of Kanagawa, Japan

[73] Assignee: Sony Corporation, Tokyo, Japan

[21] Appl. No.: 901,226

[22] Filed: Jun. 19, 1992

[30] Foreign Application Priority Data

Jun. 28, 1991 [JP] Japan .................. 3-183609

[51] Int. Cl.⁵ ............................................. H04N 5/782
[52] U.S. Cl. ................................... 358/335; 358/310; 358/312; 358/328
[58] Field of Search ............... 358/335, 312, 310, 328; 380/33.1, 35.1, 32, 10.1, 10.3; H04N 5/782

[56] References Cited

U.S. PATENT DOCUMENTS

| | | | |
|---|---|---|---|
| 4,719,518 | 1/1988 | Kido et al. | 358/328 |
| 4,725,896 | 2/1988 | Ohira et al. | 358/328 |
| 4,862,292 | 8/1989 | Enari et al. | 360/32 |
| 4,905,104 | 2/1990 | Okamoto et al. | 360/32 |
| 4,963,992 | 10/1990 | Doi et al. | 358/335 |
| 5,023,710 | 6/1991 | Kondo et al. | 358/335 |
| 5,032,927 | 6/1991 | Watanabe et al. | 358/335 |
| 5,051,846 | 9/1991 | Tsushima et al. | 358/343 |
| 5,164,831 | 11/1992 | Kuchta et al. | 360/35.1 |

*Primary Examiner*—Tommy P. Chin
*Assistant Examiner*—Huy Nguyen
*Attorney, Agent, or Firm*—William S. Frommer; Alvin Sinderbrand

[57] ABSTRACT

Digital video tape recording apparatus of the type which converts a vertical interval of picture data into image blocks of digital picture element data that is compression encoded and recorded on video tape which is selectively driven at first or second speeds, wherein the second speed is approximately 1.5 times faster than the first speed. The digital video recorder includes two rotatable transducers disposed approximately 180° apart, each transducer having a recording gap length, or head width, for recording a track pitch, the gap length being at least equal to the track pitch that is recorded when the tape is driven at the second speed. The transducers have respectively different azimuth angles to minimize crosstalk interference during playback.

11 Claims, 5 Drawing Sheets

DIGITAL VIDEO RECORDER OPERABLE IN STANDARD AND LONG PLAY MODES

BACKGROUND OF THE INVENTION

This invention relates to video signal recording and, more particularly, to digital video recording apparatus of compact size for recording digital video signals in standard and long play modes.

Digital signal recording apparatus, such as digital video tape recorders (DVTRs) have been developed for broadcasting purposes and result in the reproduction of video pictures having excellent quality. DVTR systems have been developed with two distinct formats: the so-called component digital recorder, known as the D-1 format, and the so-called composite type digital recorder, known as the D-2 format.

The D-1, component type format, records a luminance component and two color difference components by converting these components from analog to digital form. The luminance component is digitized with a sampling frequency of 13.5 MHz and each color difference component is digitized with a sampling frequency of 6.75 MHz. Since the ratio of the sampling frequencies of the luminance and color difference components is 4:2:2, the D-1 video recording technique also is referred to as the 4:2:2 technique.

When recording color video signals in the D-2 format, a composite color video signal is digitized with a samplying frequency that is four times the frequency $f_{sc}$ of the chrominance subcarrier. The digitized composite color video signal of the sampling frequency $4f_{sc}$ then is processed and recorded.

The emphasis of digital video recording systems has been on enhancing the video picture reproduced therefrom. To this effect, each video signal sample is represented as an 8-bit digital signal, and these 8-bit samples typically are recorded without data compression. As a consequence, the quality of the recorded digital video information is quite high, but a typical video picture is represented by an extraordinary amount of information. Hence, a large quantity of record medium is needed for such high quality digital recording.

As an example of the amount of data needed to represent a digital video signal, reference is made to the D-1 format. When 8-bit data samples are produced by sampling the luminance and color difference components with the aforementioned sampling frequencies of 13.5 MHz and 6.75 MHz, respectively, the amount of information used to represent the video signal is about 216 MB/sec. This quantity of data can be reduced by omitting horizontal and vertical blanking periods and by sampling only those raster line intervals which contain useful video information. If 720 luminance pixels, 360 first color difference pixels and 360 second color difference pixels are sampled in each horizontal period, and if 250 lines per field contain useful video information, then the amount of data $D_v$ needed to represent an NTSC field in, the D-1 format, without data compression, is calculated to be:

$$D_v=(720+360+360)\times 8\times 250\times 60=172.8 \text{ MB/sec.}$$

Similarly, if the D-1 format is used to record PAL video signals, the number of line intervals per field which contain useful video information is 300 and the field repetition rate is 50 per second, resulting in a data amount $D_v$ of:

$$D_v=(720+360+360)\times 8\times 300\times 50=172.8 \text{ MB/sec.}$$

As is typical for digital recording, redundant data normally is added to the useful data for the purpose of error correction, and still additional data is added for formatting purposes. This increases the amount of data needed to represent video signals in the D-1 format to about 205.8 MB/sec.

As is known, audio information is digitized and recorded in the same track as the video information in the D-1 format. Typically, the amount of audio data $D_a$ that is recorded is on the order of about 12.8 MB/sec. Moreover, a typical track of digital data recorded in the D-1 format includes preamble and postamble data as well as additional data and margin for use in editing purposes. The amount of such additional data $D_o$ is on the order of about 6.6 MB/sec. Thus, even if the redundant data typically used for error correction and formatting is omitted, the amount of $D_t$ needed for the D-1 DVTR format is calculated as:

$$D_t=D_v+D_a+D_o=172.8+12.8+6.6=192.2 \text{ MB/sec.}$$

When recording this amount of data $D_t$ in the D-1 format on video tape, one field of video information in the NTSC system is recorded in ten tracks and one field of video information in the PAL system is recorded in twelve tracks.

The recording tape normally used with digital video recorders is 19 mm wide. Typically, such video recording tape admits of two thicknesses: 13 $\mu$m and 16 $\mu$m. Such video recording tape is housed in a cassette and, depending upon the length of tape stored therein, these cassettes are known as large cassettes (L), medium cassettes (M) and small cassettes (S). Heretofore, the storage density for recording data in the D-1 format has been on the order of about 20.4 $\mu m^2$/bit. If the storage density is increased, that is, if the recording area assigned to each bit on the magnetic tape is reduced, errors in the reproduced data tend to increase because of intersymbol interference, waveform deterioration caused by nonlinearities in the electromagnetic conversion (or interface), and the like. Even if error correction codes are used for recording, the storage density generally has not been able to be increased beyond 20.4 $\mu m^2$/bit.

In accordance with the foregoing parameters, namely bit storage density, the amount of data used for recording in the D-1 format and usual tape transport speed, the typical recording capacity (in terms of recording time) on video tape having a thickness of 13 $\mu$m in cassettes of different sizes is as follows:

| S cassette | 13 minutes |
| M cassette | 42 minutes |
| L cassette | 94 minutes |

The typical recording capacities for these cassettes if the tape thickness is 16 $\mu$m are as follows:

| S cassette | 11 minutes |
| M cassette | 34 minutes |

| -continued | |
|---|---|
| L cassette | 76 minutes |

Thus, when recording video information in the D-1 format, the maximum recording capacity for video tape that is 19 mm wide and that is housed in the L cassette is only about 1½ hours. Notwithstanding the excellent picture quality that is produced from the DVTR, the recording capacity of even the largest D-1 cassette is not acceptable for consumer use. Although this limited recording capacity is satisfactory for broadcast purposes, it simply is too small for home use.

In contrast to digital video recording systems, conventional analog systems, such as Beta, VHS and 8-mm, admit of practical consumer use because they exhibit sufficient recording capacities of at least 2 hours or more. The quality of the video picture reproduced from such analog VTRs generally is quite good. However, when copies of an analog video tape are made, the rerecording of such analog video signals or the editing-/dubbing thereof gradually degrades the quality of the video picture which eventually is reproduced. After several re-recordings, editings and/or dubbings, the quality of the video picture is so poor that it is not easily perceived by a user.

To overcome this problem, a digital video recorder has been proposed for use with magnetic tape that is 8 mm wide, or even narrower. Video data is compressed in a format that reduces distortion, increases recording density and effectively increases recording capacity.

As is known to most users of VTR systems, a conventional analog VTR, such as the 8 mm system, exhibits at least two recording modes, referred to as standard play (SP) and long play (LP) modes. The speed at which the video tape is transported in a standard play (SP) mode is greater than the tape transport speed in an LP mode. Thus, for a given time duration, less magnetic tape is consumed when video signals are recorded in the LP mode than in the SP mode. If a user wishes to record a broadcasted television program, one or the other of these modes may be selected, depending upon the duration of that program and the length of magnetic tape which remains available for recording. This selectability between SP and LP modes, although commonly found in analog VTR systems, is not used in digital VTR systems, even though this function would be useful in a digital VTR.

Like most VTR systems, the conventional 8 mm system uses rotary heads for recording and reproducing information, both in the SP and LP modes. By reason of the faster tape transport speed in the SP Node, the pitch of the tracks recorded by the rotary heads is 20.5 $\mu m$ and the pitch of the tracks recorded in the LP mode is 10.25 $\mu m$. The width of the recording/reproducing head, or stated otherwise, the gap length of the head, is 15 $\mu m$, thus resulting in a guard band of 5.5 $\mu m$ between adjacent tracks when information is recorded by these heads in the SP mode. A rotary erase head is used to provide an appropriate guard band, and the presence of one or more erase heads adds to the complexity and size of the VTR.

In both analog and digital VTRs, rotary transformers are used to couple electrical signals between the transducers and the processing circuitry. Rotary transformers generally are characterized as opposite type or concentric type transformers. In the opposite type rotary transformer, the rotor and stator are disposed opposite each other across a gap. In the concentric type of rotary transformer, the rotor and stator are disposed concentrically of each other. When the number of recording channels increases, as when a larger number of transducers is used, the diameters of the rotor and stator of the opposite type transformer increase; and the overall height of the concentric type rotary transformer increases. The existence of rotary erase heads adds to the number of channels in the rotary structure, thus increasing the overall size of the rotary transformer.

If a rotary erase head is to be avoided, with a resultant reduction in size and complexity of the mechanical system of the VTR, the head width (or gap length) of the recording heads should be matched to the track pitch formed by recording in the SP mode. In the present example, guard bands are eliminated and, thus, rotary erase heads are made unnecessary, if the gap length of the recording head is equal to the 20.5 $\mu m$ pitch of the SP record tracks. However, if the gap length of the record head is increased from 15 $\mu m$ to 20.5 $\mu m$, the head overlaps a substantial portion of an adjacent track when the VTR operates to reproduce video information in the LP mode. Indeed, an entire adjacent track may be picked up when the head scans a target, or desired track.

Although adjacent tracks are recorded in both the SP and LP modes by heads which exhibit different azimuth angles, thus relying on the phenomenon of azimuth loss to reduce crosstalk interference picked up from an adjacent track during reproduction, it is known that crosstalk suppression due to azimuth loss is not perfect. Such crosstalk suppression is quite effective if only a portion of an adjacent track is picked up, but the carrier-to-noise (C/N) ratio of the reproduced signal, which is an indication of crosstalk suppression, decreases as the head overlaps a greater portion of the adjacent track. If the head overlaps the entire width of the adjacent track, as may occur if the gap length is 20.5 $\mu m$ and the track scanned by the head in the LP mode has a width of 10.25 $\mu m$, the C/N ratio is sufficiently deteriorated as to make crosstalk interference a significant problem. Thus, if tape speed in the SP mode is twice the tape speed in the LP mode, the gap length of the recording/reproducing heads should be less than the pitch of the tracks that are recorded in the SP mode and, thus, the use of rotary erase heads cannot be easily avoided.

OBJECTS OF THE INVENTION

Therefore, it is an object of the present invention to provide digital video tape recording (DVTR) apparatus whose mechanical arrangement is of reduced size and which permits recording and reproducing in at least standard play and long play modes.

Another object of this invention is to provide DVTR apparatus capable of recording programs of extended length on a magnetic tape housed in a cassette.

A further object of this invention is to provide a cassette-type DVTR wherein the record tape may be driven at a relatively slow speed for long play recording and at 1.5 times that speed for standard play recording, and wherein the tracks which are recorded in both modes are not separated by guard bands but, nevertheless, crosstalk that may be picked up from an adjacent track is suppressed.

An additional object of this invention is to provide a cassette-type DVTR which does not use rotating erase heads for the recording of guard bands.

Yet another object of this invention is to provide a cassette-type DVTR in which the faster speed at which the record tape is transported for SP recording is a simple multiple speed at which the tape is transported for LP recording, thus permitting a user to easily convert the recording time (or capacity) of a cassette operating in the SP mode to the recording time for that same cassette when the DVTR operates in the LP mode.

A further object of this invention is to provide a cassette-type DVTR which is operable in SP and LP modes and wherein the storage capacity for the LP mode is a simple multiple of the storage capacity for the SP mode.

Various other objects, advantages and features of the present invention will become readily apparent from the ensuing detailed description, and the novel features will be particularly pointed out in the appended claims.

SUMMARY OF THE INVENTION

In accordance with this invention, digital video tape recording (DVTR) apparatus is provided with a selectable drive. The DVTR is of the type in which a vertical interval, such as a field, of picture data is converted into image blocks of digital picture element data, which are compression encoded recorded. The selectable tape drive operates to drive the record tape at a relatively slow speed for long play (LP) recording, at a faster speed on the order of about 1.5 times the slow speed for standard play (SP), recording. The DVTR further includes rotatable transducers having a head width, or recording gap length, at least equal to the pitch of the record tracks that are recorded during the SP mode, the transducers having respectively different azimuth angles. As a result, guard bands are not recorded, even when the DVTR operates in its SP mode.

As a desirable feature of this invention, the gap length of the transducers is small enough such that, when the DVTR reproduces video information in the LP mode, that portion of an adjacent track which the transducer overlaps (because the pitch of the tracks recorded in the LP mode is less than the gap length) is sufficiently small that the C/N ratio is not significantly deteriorated and, thus, crosstalk is satisfactorily suppressed.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF PREFERRED EMBODIMENTS

Figure 1:
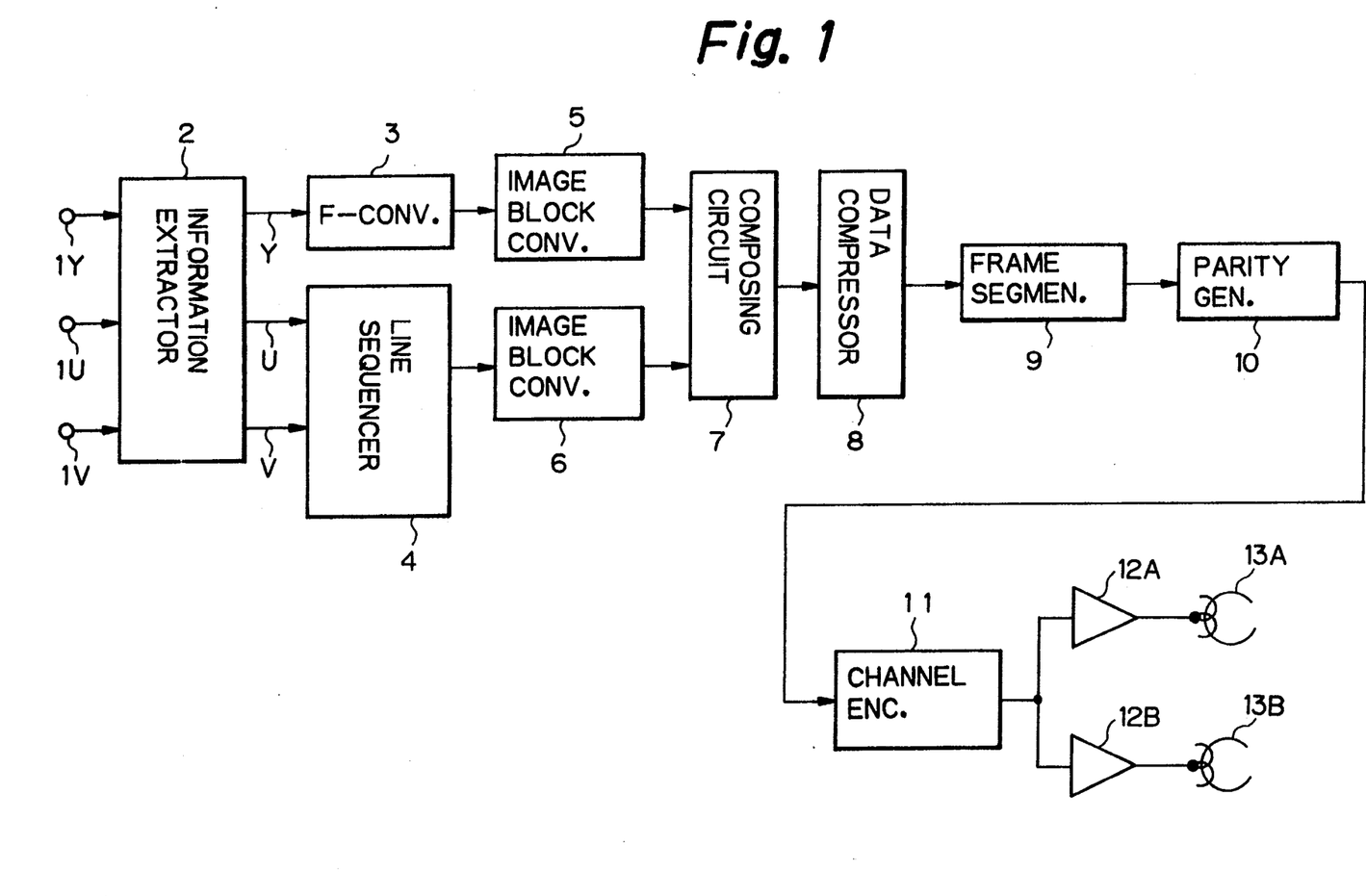
FIG. 1 is a block diagram of digital video recording apparatus in which the present invention finds ready application.

Referring now to the drawings, FIG. 1 is a block diagram of digital video recording apparatus in which the present invention finds ready application. As an example, the video recording apparatus shown in FIG. 1 may be used directly with a video camera and may be incorporated in the same housing therewith, such as a so-called "camcorder". Alternatively, the apparatus of FIG. 1 may be supplied with video signals recovered from broadcasted or previously recorded television signals.

In any event, the illustrated apparatus is comprised of an information extractor 2, a frequency converter 3, a line sequencer 4, image block converters 5 and 6, a data compressor 8, a channel encoder 11 and recording heads 13A and 13B. Information extractor 2 is coupled to input terminals 1Y, 1U and 1V and is adapted to receive a digital luminance signal Y and digital color difference signals U and V, respectively. In one embodiment, the digital luminance and color difference signals are derived from the three primary color signals red, green and blue produced by a color video camera. Alternatively, the digital luminance and color difference signals are derived from reproduced television signals or from broadcasted television signals. It will be appreciated that the derivation of digital luminance and color difference signals Y, U and V and the application of these signals to information extractor 2 are conventional and further description thereof need not be provided. Suffice it to say, however, that the data rate (or sampling frequency) of the 8-bit digital luminance sample is 13.5 MHz and the data rate (or sampling frequency) of each 8-bit digital color difference sample U or V is 6.75 MHz. Thus, information extractor 2 is supplied with video data at the rate of about 216 MB/sec.

The information extractor functions to extract useful luminance and color difference information from the digital luminance and color difference signals supplied thereto and to discard the usual video signals which do not comprise useful video information. For example, signals that are included in line intervals which typically are not displayed on a conventional television monitor as well as various synchronizing and equalizing signals are discarded. Information extractor 2 includes output terminals to which the extracted digital luminance signal Y and the extracted digital color difference signals U and V are supplied, respectively. Hence, the information extractor compresses the video data to about 167 MB/sec.

Frequency converter 3 is coupled to information extractor 2 and is adapted to convert the sampling frequency, or data rate, of the digital luminance signal Y. As mentioned above, the sampling frequency of this luminance signal may be on the order of 13.5 MHz; and the frequency converter is adapted to reduce that frequency to approximately three-fourths ($\frac{3}{4}$) of its original sampling frequency. As will be known by those of ordinary skill in the art, frequency converter 3 may be implemented by a thin-out filter that prevents aliasing noise. The frequency-converted digital luminance signal Y is supplied from frequency converter 3 to image block converter 5.

The output terminals of information extractor 2 to which the extracted digital color difference signals U and V are supplied are coupled to line sequencer 4. The line sequencer is adapted to reduce the sampling frequency, or data rate, of each of the digital color difference signals U and V to one-half (½) of its original 6.75 MHz sampling frequency and to select alternate ones of these frequency-reduced color difference signals on a line-by-line basis. For example, one line of the frequency-reduced digital color difference signal U is followed by the next line of the frequency-reduced color difference signal V. Thus, line-sequential, frequency-reduced digital color difference signals U and V are produced by line sequencer 4. These line sequential, frequency-reduced color difference signals are supplied to image block converter 6.

Image block converters 5 and 6 are adapted to form blocks of frequency-reduced video signals supplied thereto from frequency converter 3 and line sequencer 4, respectively. For example, a predetermined number of samples, such as an 8×8 array of samples, is arranged as an image block by each of these image block converters, and each vertical interval of samples (e.g. each field or frame of samples) is segmented into a large number of image blocks. As illustrated, image block converters 5 and 6 are coupled to a composing circuit 7 which operates to form a single channel of digital video data from the block of frequency-reduced digital luminance signals and from the block of frequency-reduced, line sequential color difference signals produced by the respective block converters. Composing circuit 7 is coupled to data compressor 8 which is adapted to compress the data included in the single channel of video information composed by the composing circuit. For example, data compressor 8 may comprise an orthogonal transform circuit, such as a discrete cosine transform circuit, or it may comprise an adaptive dynamic range coder (ADRC), or other known circuits. As a result, the amount of data needed to represent the original luminance and color difference signals is reduced.

The output of data compressor 8 is coupled to a framing circuit 9 which operates to convert the clock frequency of the data-compressed frequency-reduced luminance and color difference signals to a clock rate that is particularly compatible for recording. In addition, the framing circuit converts the block structure format produced by image block converters 5 and 6, composing circuit 7 and data compressor 8 to a frame structure data format.

Framing circuit 9 is coupled to channel encoder 11 by way of a parity generator 10. The parity generator operates in conventional manner to generate parity bits from the frames of compressed data supplied thereto by framing circuit 9, these parity bits being used for error correction purposes during a reproduction operation.

The channel encoder operates to reduce the DC and low frequency components of the video data to be recorded and may encode the video and audio data in conventional manner and in accordance with typical recording codes, such as 1,7 code, MFM code, NRZI, etc. The output of channel encoder 11 is coupled to recording heads 13A and 13B by way of recording amplifiers 12A and 12B, respectively, and rotary transformers (not shown).

The video recording apparatus illustrated in FIG. 1 may be of conventional construction known to those of ordinary skill in the art. Frequency converter 3 and line sequencer 4 reduce the video data from about 167 MB/sec. to 84 MB/sec. This reduced data is compressed by data compressor 8 to about 25 MB/sec. When parity and audio data are added to this compressed video data, the amount of data presented for recording is about 31.56 MB/sec.

As describe above, composing circuit 7 forms a single channel of the image blocks produced by image block converters 5 and 6. Alternatively, the image blocks of luminance samples and the image blocks of color difference samples may be compressed separately, as by individual data compressors similar to data compressor 8, and the compressed luminance and color difference blocks of samples then may be combined by a composing circuit.

Figure 2:
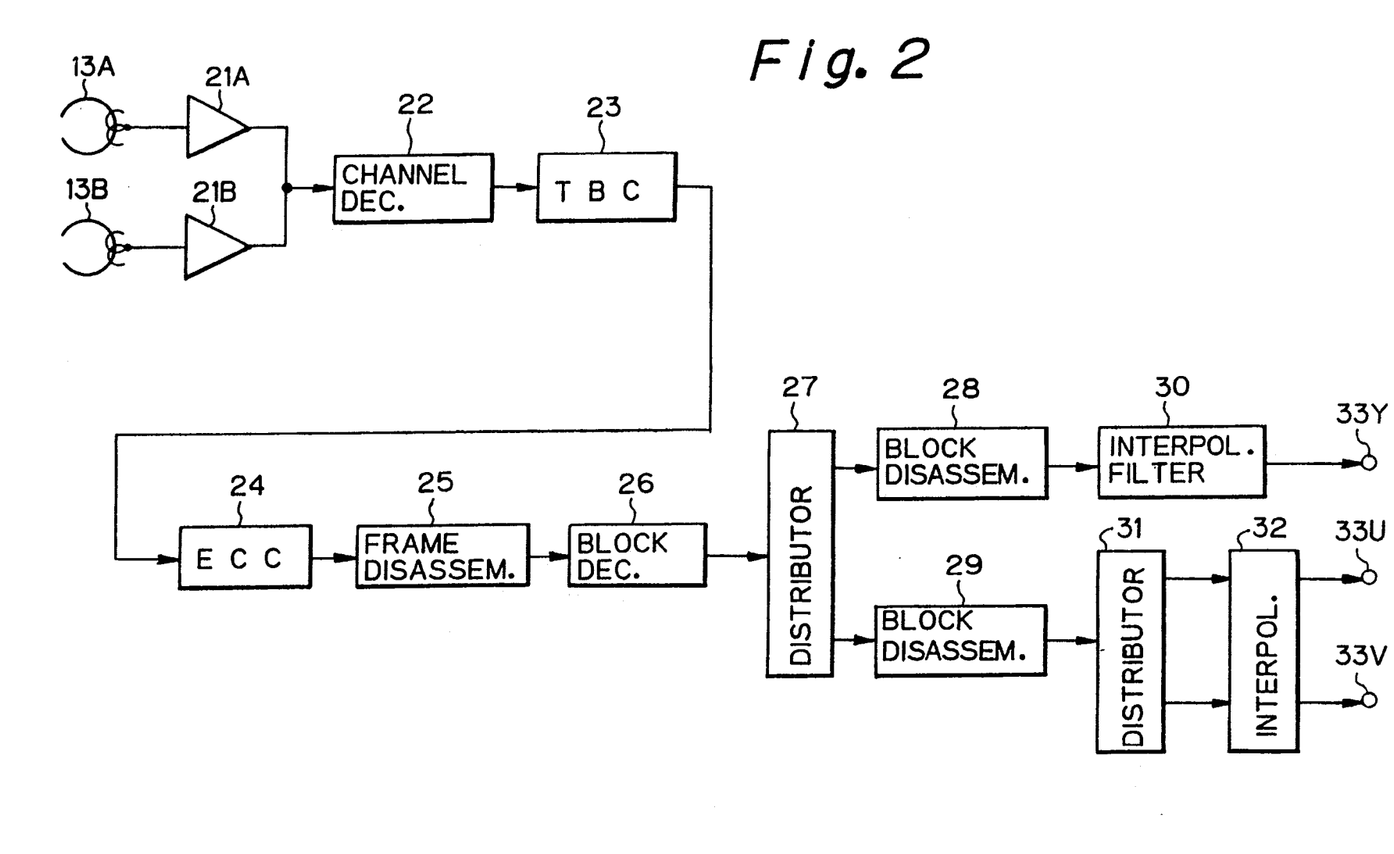
FIG. 2 is a block diagram of digital video reproducing apparatus which can be used with the present invention.

Turning now to FIG. 2, there is illustrated a block diagram of apparatus adapted to reproduce the video data recorded on a record medium by the apparatus shown in FIG. 1. It is assumed that recording heads 13A and 13B are used to reproduce the digital and audio data from successive record tracks on the tape, and are referred to as read heads.

As shown, the reproducing apparatus of FIG. 2 is comprised of a channel decoder 22, a time base corrector 23, a block decoder 26, a distributor 27, inverse blocking circuits (or block disassemblers) 28 and 29, and interpolators 30 and 32. Channel decoder 22 is adapted to decode the digital signals recorded in the form encoded by channel encoder 11. Accordingly, channel decoder 22 is compatible with channel encoder 11 and functions to recover the particular encoded format that was used for recording, such as 1,7 code, MFM code, NRZI, etc. The input of channel decoder 22 is coupled to read heads 13A and 13B by amplifiers 21A and 21B, respectively, and rotary transformers (not shown). The output of the channel decoder is coupled to time base corrector 23.

The time base corrector is conventional and is adapted to remove jitter and other time base errors that may be present in the reproduced digital data. The output of the time base corrector is coupled to a deframing circuit 25 by way of an error checking and correction (ECC) circuit 24. The ECC circuit is adapted to correct errors that may be caused by minor defects in the record medium or that may be produced during the recording and/or reproducing operations. ECC circuitry and the operation of such circuits are known to those of ordinary skill in the art. If an error is not correctable by the ECC circuit, an error flag is set and further error correction is made by way of interpolators 30 and 32, as will be described.

Deframing circuit 25 is compatible with composing circuit 7 (FIG. 1) and is adapted to carry out an inverse operation. It will be appreciated that the deframing circuit thus converts the recovered bit rate, or data clock, from the frequency normally used for recording to a frequency used for video processing. In addition, the frame structure that had been used by framing circuit 9 to record the video data is reconverted back to block format. This block-formatted video data is coupled from deframing circuit 25 to block decoder 26 which is compatible with data compressor 8 and carries out an inverse operation. For example, if the data compressor functions to compress video data by means of discrete cosine transform, block decoder 26 implements an inverse discrete cosine transform operation. Similarly, if the data compressor carried out an adaptive dynamic range coding operation, the block decoder implements an adaptive dynamic range decoding operation. It will be appreciated that the decoded output of block decoder 26 is substantially similar to the input of data compressor 8.

Distributor 27 is coupled to block decoder 26 and distributes the decoded video data into a luminance channel Y and color difference channels U and V. The luminance channel is coupled from distributor 27 to inverse blocking circuit 28 which functions to recover raster scan data from the image blocks that had been produced by image block converters 5 and 6 in the recording apparatus. Thus, block sequence data is decoded into a raster scanning sequence of data. It will be appreciated that inverse blocking circuit 28 thus recovers a raster scanning sequence of luminance data and inverse blocking circuit 29 recovers a raster scanning sequence of color difference data U and V.

Inverse blocking circuit 29 is coupled to distributor 31 which distributes the line sequential color difference signal data U and V to separate outputs which, in turn, are coupled to interpolator 32. Thus, interpolator 32 receives line sequential color difference data U and V and operates to correct errors therein that were not correctable by ECC circuit 24 and also operates to provide those raster lines of color difference data that had not been recorded. It is recalled that, in line sequential format, one line of color difference data U is followed by another line of color difference data V. Thus, alternate lines of color difference data are recorded in the line sequential format. Interpolator 32 supplies to output terminals 33U and 33V the original color difference data in successive lines. In addition, whereas line sequencer 4 had reduced the sampling rate of the color difference data signals to ½ the original data rate, interpolator 32 recovers the original sampling rate by multiplying the data rate of the color difference data signals U and V by the factor 2. Thus, color difference data samples are supplied to output terminals 33U and 33V at a sampling rate substantially equal to the original sampling rate of the color difference data signals U and V produced by information extractor 2.

Inverse blocking circuit 28 is coupled to interpolator 30 which operates to correct errors that were not correctable by ECC circuit 24. In addition, whereas frequency converter 3 of the recording apparatus shown in FIG. 1 reduced the sampling rate of luminance data signals Y to a sampling rate of ¾ their original rate, interpolator 30 recovers the original sampling rate by multiplying the data rate of the luminance signal data Y by the factor 4/3. Hence, interpolator 30 supplies to output terminal 33Y a digital luminance data signal whose clock rate $4f_{sc}$ is substantially the same as the 13.5 MHz clock rate of the digital luminance signal data Y produced by information extractor 2.

Figure 3:
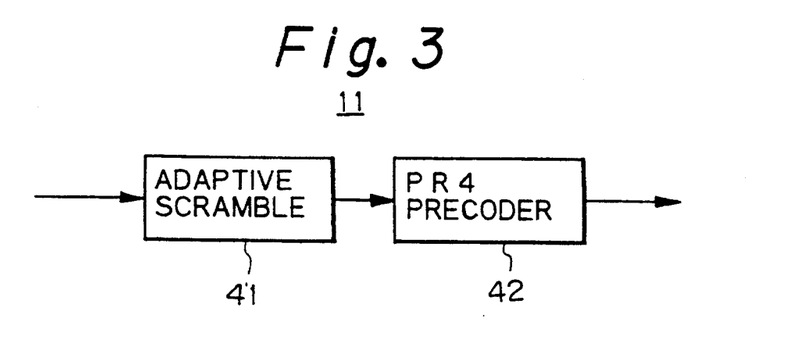
FIG. 3 is a block diagram of a channel encoder which can be used with the digital video recording apparatus of FIG. 1.

One embodiment of channel encoder 11 of the digital video recording apparatus shown in FIG. 1 is illustrated in FIG. 3 as being comprised of an adaptive scrambler 41 coupled to a partial response class 4 encoder 42. One example of scrambler 41 and encoder 42 is described in Japanese Application Ser. No. 1-143491 (1989), wherein adaptive scrambler 41 includes M scrambling circuits. The particular scrambling circuit that is selected is the scrambling circuit which minimizes the DC components and low frequency components of the output signal produced thereby.

Partial response class 4 encoder 42 exhibits the transfer function $1/1-D^2$, where D is a unit delay. The signal encoded by partial response class 4 encoder 42 is coupled to recording heads 13A and 13B via amplifiers 12A and 12B.

Figure 4:
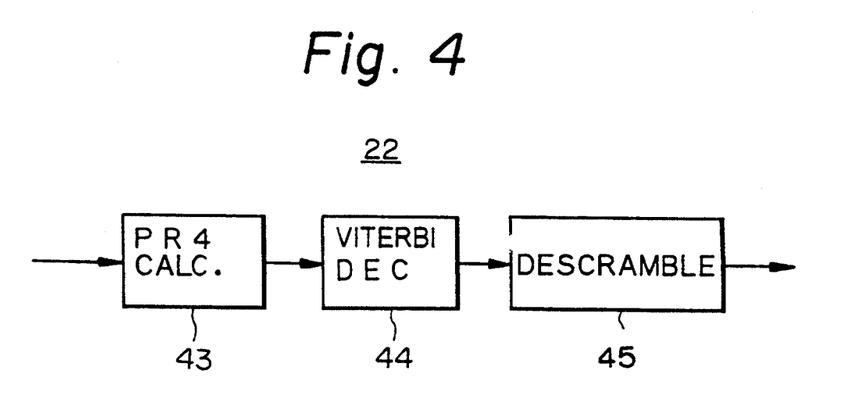
FIG. 4 is a block diagram of a channel decoder that can be used with the digital video reproducing apparatus of FIG. 2.

Similarly, one embodiment of channel decoder 22 included in the reproducing apparatus of FIG. 2 is illustrated in FIG. 4. An example of this channel decoder also is described in aforementioned Japanese Application 1-143491. As shown, channel decoder 22 is comprised of a partial response class 4 processor 43, a Viterbi decoder 44 and a descrambler 45. The partial response class 4 processor is connected to receive the digital signals reproduced by read heads 13A and 13B and performs a processing operation having a transfer function of $(1+D)$. The processed digital signals then are decoded in accordance with Viterbi decoding known to those of ordinary skill in the art. Such decoding is a function of correlation and probability; and is fully described in the literature. As is known, Viterbi decoding exhibits good noise immunity, and in one embodiment achieves an improvement of 3dB in the C/N ratio when compared to conventional bit-by-bit decoding. The Viterbi-decoded digital signals are descrambled by descrambler 45 which is compatible with the scrambler that was selected in adaptive scrambler 41. Hence, the descrambled digital signals are of substantially the same form as the digital signals that were supplied to channel encoder 11 in the recording apparatus.

Figure 5:
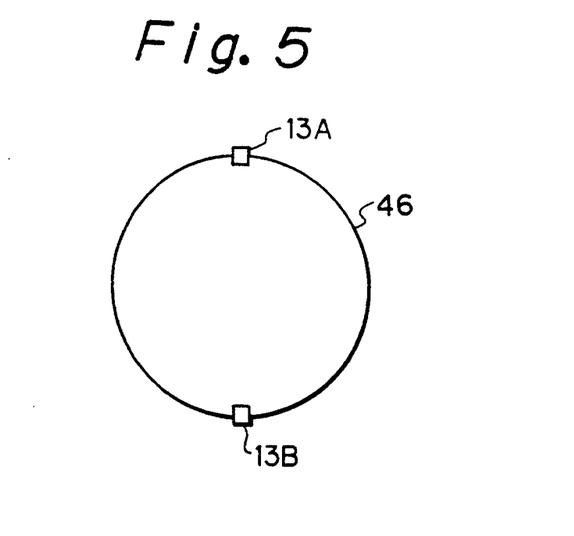
FIG. 5 is a schematic representation of the locations of the recording/reproducing heads in a digital video recorder.

Record/reproducing heads 13A and 13B of FIGS. 1 and 2 are mounted approximately 180° apart on a rotary drum 46, such as shown in FIG. 5. For recording digital video signals in the NTSC system, drum 46 rotates at a relatively high speed, such as on the order of 150 rps (or 9,000 rpm). As mentioned heretofore, one field interval of video signals is recorded in ten tracks, thus segmenting a field into submultiples and thereby permitting the recording of a field interval in shorter tracks. Consequently, even though the magnetic tape is scanned helically, such shorter tracks appear to be substantially linear and errors which would otherwise arise from scanning nonlinear tracks (known as linearity errors) are avoided, or at least minimized. Magnetic tape is deployed, or wound, about drum 46 with a wrap angle on the order of about 180°, plus or minus small amounts. Hence, heads 13A and 13B scan alternate tracks across the magnetic tape as drum 46 rotates.

Figure 6:
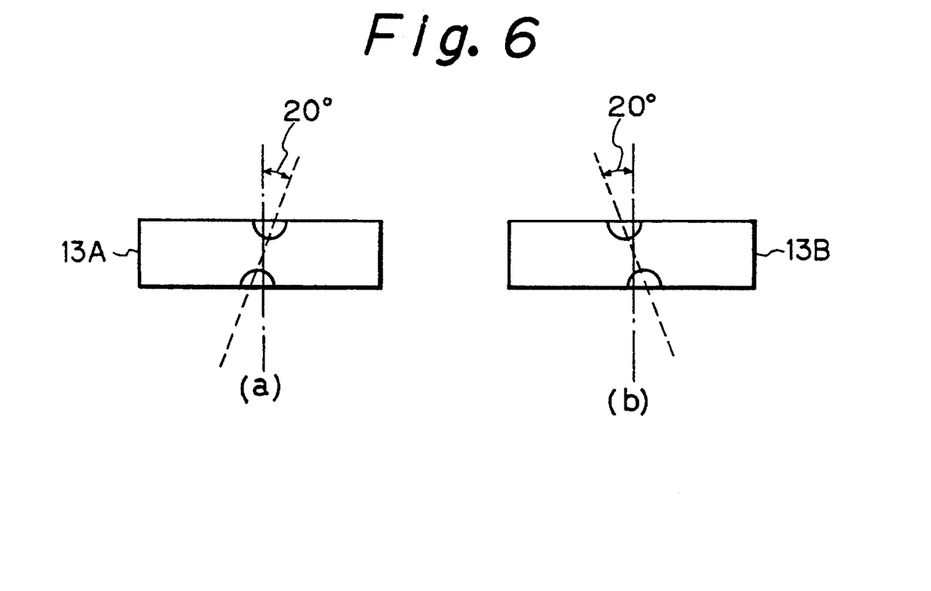
FIG. 6 is a schematic diagram illustrating different azimuth angles of the recording/reproducing heads.
Figure 7:
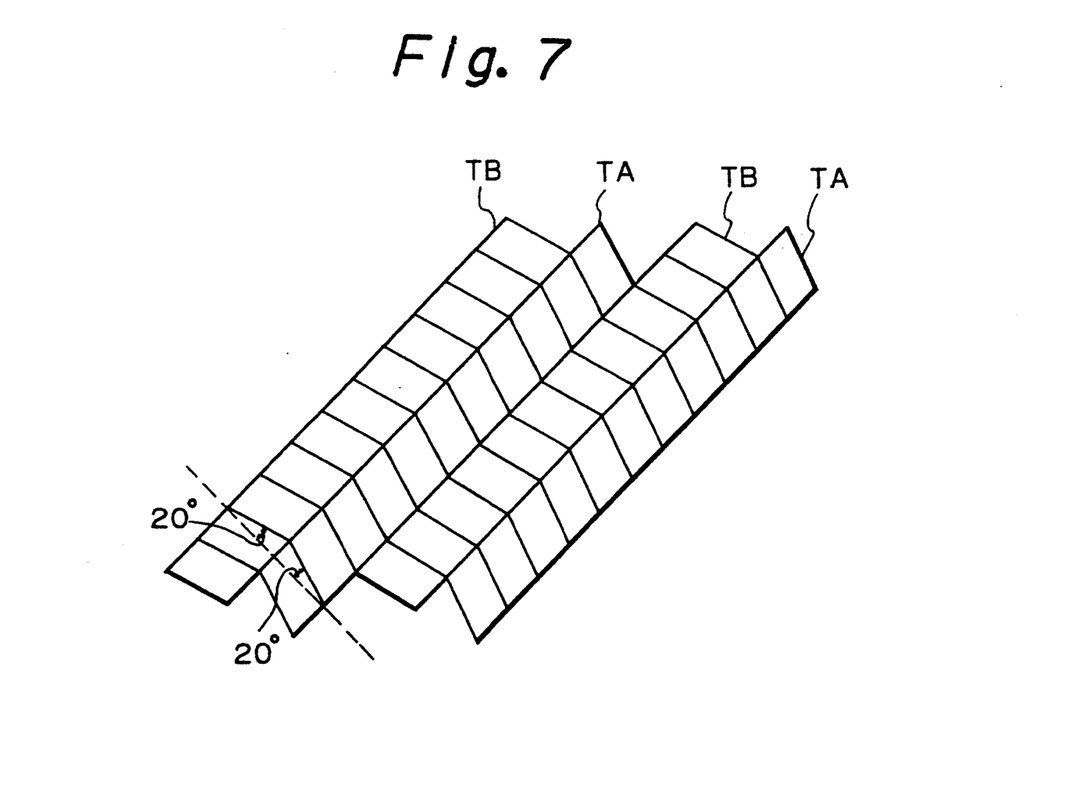
FIG. 7 is a schematic representation of a track pattern recorded by the heads shown in FIG. 6.

To exploit the phenomenon of azimuth loss and thereby reduce crosstalk picked up from an adjacent track during signal reproduction, the azimuth angles of heads 13A and 13B differ from each other. As shown in FIG. 6A, head 13A exhibits an azimuth angle of +20° and head 13B exhibits an azimuth angle of −20°, relatively to a direction normal to the head movement direction, FIG. 7 schematically illustrates the track pattern formed as a result of these heads. In particular, track TA is recorded by head 13A having the azimuth angle shown in FIG. 6A; and track TB is formed by head 13B having the azimuth angle shown in FIG. 6B. As a result of azimuth loss, when head 13A scans track TA, the level of the signals picked up from adjacent track TB is very low because the azimuth angle with which track TB was recorded differs from the azimuth angle of head 13A which scans track TA.

Because of azimuth loss, the recording density can be increased. For example, if the magnetic tape is a metal evaporation (ME) tape, digital video signals may be recorded thereon with a recording density of 1.25 $\mu m^2$/bit, or even less. In this example, the track pitch recorded by the heads shown in FIGS. 6A and 6B may be on the order of about 5 µm, and a data bit may be recorded with a 0.5 µm wavelength. This results in a recording density of 1.25 µm²/bit.

It is a feature of the present invention to provide two recording modes and the same two reproducing modes for a DVTR, namely SP and LP modes. These two modes are achieved by changing the speed at which the recording tape is transported, from a tape speed of VL when recording (or reproducing) in the LP mode to a tape speed VS=1.5VL when recording (or reproducing) in the SP mode. This ratio of VS/VL=1.5 has been selected so that the user may readily convert recording capacity (in terms of recording time) between the SP and LP modes. For example, if a video cassette containing a given quantity of tape exhibits a recording capacity of two hours when the DVTR operates in its SP mode, that same cassette can be used to record up to three hours of video signals when the DVTR operates in its LP mode. It is seen that the selection of the SP or LP mode thus is a function of the duration of the video information or program to be recorded and the storage capacity (primarily the SP mode storage capacity) of the cassette being used. Although the error rate expected from a DVTR operating in the LP mode differs from the error rate when the DVTR operates in the SP mode, the quality of the video picture that is obtained from digital video recording does not change markedly from one mode to the other. Nevertheless, when video information is to be recorded with high reliability, or when the recorded video tape is to be used on machines of different manufacturers and, thus, recording compatibility is important, the SP mode is most likely to be used.

Figure 8:
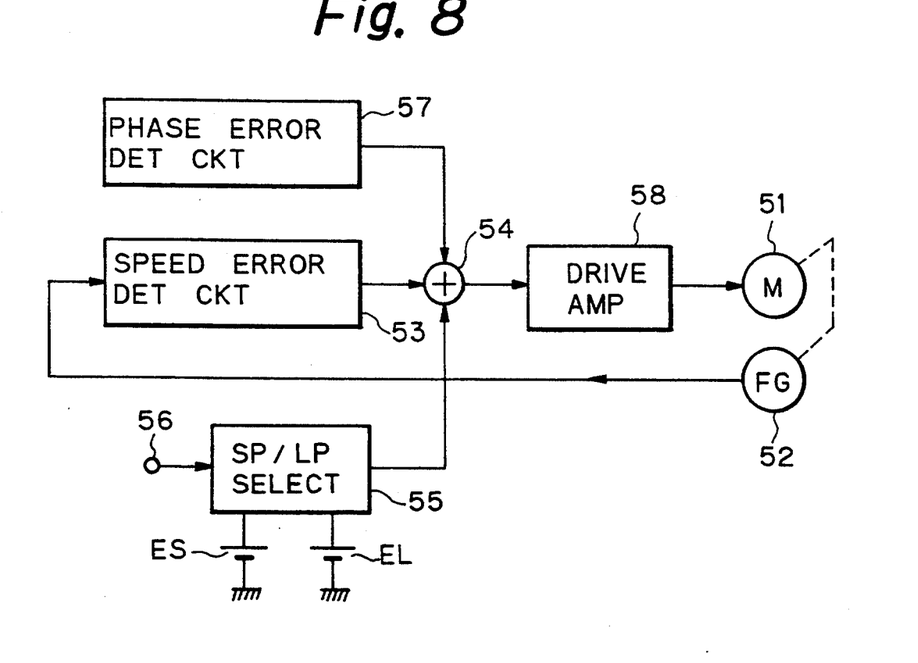
FIG. 8 is a block diagram of one embodiment of a tape speed selector that may be used with the present invention.

FIG. 8 is a block diagram of one embodiment of a tape speed selector whereby tape may be transported at the appropriate speed for recording in either the SP or LP mode. Here, the speed selector is comprised of a speed error detector 53, a mode selector 55 and a drive amplifier 58. A capstan motor 51 is driven by a drive signal supplied thereto from drive amplifier 58, and the capstan motor is mechanically coupled to a frequency generator 52 which operates to generate a frequency that is proportional to the rotational speed of the capstan motor. As the capstan speed changes, thus changing the tape transport speed, the frequency generated by frequency generator 52 likewise changes. Frequency generator 52 is coupled to speed error detector 53 which responds to the frequency supplied thereto to generate a DC voltage that is a measure of the difference between the actual speed of capstan motor 51 and a desired SP or LP speed.

Mode selector 55 includes a control input terminal 56 to which an SP/LP select signal is applied. For example, a processor included in the DVTR may respond to an SP/LP selector switch to couple a suitable selection signal to mode selector 55. The mode selector is adapted to provide a DC reference level of a magnitude which represents either SP or LP selection. For example, a DC voltage ES may be provided at the output of mode selector 55 when a standard play mode is selected; and, conversely, a DC voltage EL may be provided when a long play mode is selected.

The reference voltage produced by mode selector 55 is combined with the DC error voltage produced by speed error detector 53 in a summing circuit 54. The output of the summing circuit is supplied to drive amplifier 58 which, in turn, drives capstan motor 51 accordingly.

Another component of the drive signal supplied to the capstan motor is produced by a phase error detector 57. As is conventional when recording digital video signals in, for example, the D-1 mode, a longitudinal control track is recorded. This track includes a series of pulses which, during a playback operation, are used to synchronize the movement of the tape with the rotation of the heads. Phase error detector 57 is adapted to detect a phase error in this tape-to-head synchronization; and the phase error is combined with the detected speed error and mode select voltage in summing circuit 54. The combined speed error signal, phase error signal and SP/LP mode signal are supplied to drive amplifier 58 for driving capstan motor 51.

When the DVTR operates to record video signals, the user selects either the SP or LP mode, as by operating a suitable selector switch. A corresponding SP or LP control signal is supplied to input terminal 56, as by the DVTR system controller. Alternatively, if the DVTR is operated to reproduce video signals, the appropriate SP or LP control signal is coupled to input terminal 56 from the system controller in accordance with a mode determining operation which, preferably, is carried out automatically in response to the reproduced video signal. For example, the envelope of the reproduced signal admits of a first level when the reproduced video signals were recorded in the same SP or LP mode as the reproducing apparatus now is operating, and of a second level when the reproducing mode differs from the mode that had been used for recording. In the latter event, the operating mode of the reproducing apparatus simply is switched. Thus, the correct SP or LP reproducing mode is selected automatically; and a corresponding control signal is coupled from the system controller to input terminal 56. Hence, mode selector 55 supplies the proper DC reference voltage to drive amplifier 58 by way of summing circuit 54 to drive capstan motor 51 at the speed corresponding to the selected SP or LP mode. For example, the tape speed in the SP mode is approximately 15 mm/sec. and the tape speed in the LP mode is approximately 10 mm/sec.

If the capstan speed deviates from that established for the SP or LP mode, the frequency of the signal generated by frequency generator 52 deviates from a corresponding SP or LP frequency. Speed error detector 53 detects such deviation to generate a DC error voltage that is added to the reference voltage produced by mode selector 55 and is used by drive amplifier 58 to drive capstan motor 51. Thus, speed errors are compensated by increasing or decreasing the capstan motor drive signal, thus driving the capstan, and thereby transporting the tape, at the correct speed.

Phase errors between the pulses recorded in the longitudinal control track of the magnetic tape and, for example, a servo reference signal, such as a signal derived from the rotary position of the heads, are detected by phase error detector 57 and used as a component of the drive signal supplied to capstan motor 51 by way of summing circuit 54 and drive amplifier 58. Thus, the capstan, and thereby the tape, is driven in synchronism with this servo reference signal. Consequently, tracking errors between the scanning path of the heads and the tracks being scanned thereby are compensated. Alternatively, the automatic track following (ATF) technique commonly used in 8 mm analog video recorders may be used by the capstan drive system shown in FIG. 8 to correct for tracking errors. In this arrangement, pilot signals of four different relatively low frequencies are recorded, one at a time, in successive tracks. superimposed with the video signals that are recorded in those tracks. During reproduction, the levels of those pilot signals that are reproduced are used to detect the tracking (or phase) error of the scanning heads, and phase error detector 57 may be constructed so as to detect this error. In a recording operation, the phase error detector may generate a constant DC output voltage in place of the aforementioned phase error voltage.

Figure 9A:
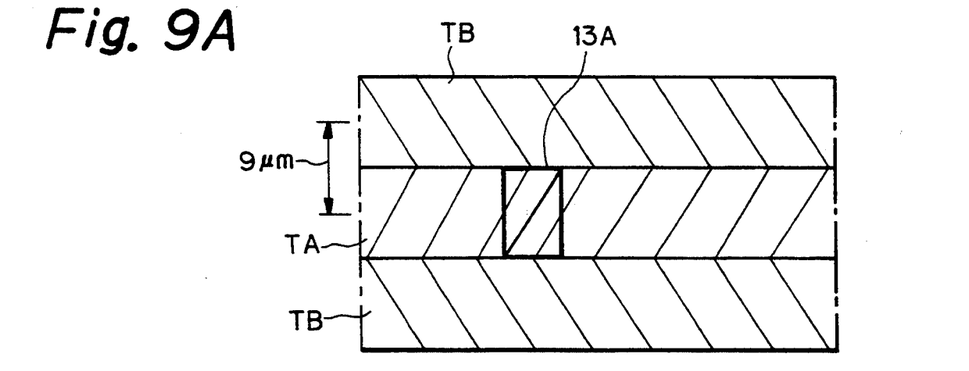
FIGS. 9A and 9B are schematic representations of track patterns scanned by a reproducing head in standard and long play reproducing modes, respectively.
Figure 9B:
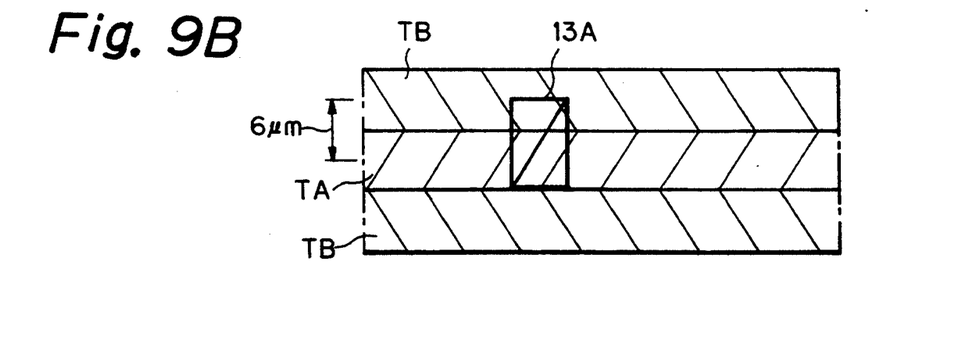

FIGS. 9A and 9B schematically illustrate the tracks that are recorded by heads 13A and 13B when the tape is transported at the higher SP speed (FIG. 9A) and at the lower LP speed (FIG. 9B). The head width, or gap length, of the recording heads, such as head 13A, is on the order of about 9 μm. The speed at which the tape is transported in the SP mode is such that the heads record successive tracks TA, TB, TA, TB, etc., with no guard bands therebetween and with a track pitch of 9 μm. That is, the tape transport speed is selected for the SP mode so as to advance the tape by an amount corresponding to a 9 μm track pitch. Since guard bands are not provided, the rotary erase head previously used to erase spurious information from such guard bands is avoided. If desired, in the SP mode, successive tracks may be recorded by heads 13A and 13B in slightly overlapped condition. That is, after head 13A records track TA, a portion of head 13B may overlap this track TA when recording the next adjacent track TB, thereby over-recording a small portion of track TA.

When reproducing the video information recorded in tracks TA and TB during the SP mode, there is substantially no overlap of, for example, head 13A with adjacent track TB as the head scans target track TA. Thus, if the tracks exhibit a track pitch substantially equal to the head width, or gap length, of the recording heads, very little crosstalk is picked up from an adjacent track when the head scans a record track during the reproducing operation. Even if adjacent tracks were recorded with a small amount of overlap, as aforesaid, thus resulting in a track pitch that is slightly less than the head width of the recording heads, the resultant small overlap of a head with an adjacent track when that head scans a target track nevertheless results in a crosstalk level which is so small that its effect is minimized.

When video data is recorded or reproduced in the LP mode, the tape is transported at a slower speed and does not advance by the same amount for each head rotation as in the SP mode. As shown in FIG. 9B, if the gap length of the recording head is about 9 μm, and if the tape speed in the LP mode is about η the tape speed in the SP mode, the head overlaps the previously recorded track by 3 μm when it records the next successive track. Hence, in the LP mode, the track width is on the order of about 6 μm.

When video data that was recorded in the LP mode is reproduced, the head overlaps an adjacent track, such as track TB, when it scans target track TA. At most, however, this overlap is only 50% of a track pitch; and in the numerical example shown in FIG. 9B, head 13A overlaps adjacent track TB by only 3 μm. Consequently, crosstalk picked up from the adjacent track tends to degrade the C/N ratio by only a relatively small amount. Thus, crosstalk interference is minimized.

If the ratio of the transport speed of the tape driven in the SP mode relative to the transport speed in the LP mode is, for example, 2, and if adjacent tracks are not separated by a guard band when video information is reproduced in the LP mode, crosstalk interference is not easily reduced. This is because the gap length of the head can overlap the entire width of an adjacent track when a target track is scanned during an LP reproduction. If this SP/LP speed ratio is increased above 2, then, during an LP playback mode the head may overlap an adjacent track as well as a portion of the track beyond that. This tends to increase crosstalk interference even more. But, if the SP/LP tape speed ratio is on the order of about 1.5, then even if the gap length of the recording/reproducing heads is slightly larger than the track pitch recorded in the SP mode, the C/N ratio is not significantly deteriorated when video information is recorded and reproduced in the LP mode.

While the present invention has been particularly shown and described with reference to a preferred embodiment, it will be readily appreciated by those of ordinary skill in the art that various changes and modifications may be made without departing from the spirit and scope of the invention. For example, the present invention can be applied to digital video recorders which record video signals in the PAL system. In addition, the present invention can be used with DVTRs for recording high definition television signals and for increasing the number of read/write heads for recording the increased information which represents such high definition television signals. As a numerical example, the present invention is readily applicable to a DVTR system which uses four or more magnetic heads for recording and reproducing. It is intended that the appended claims be interpreted as covering the embodiment specifically described herein, those alternatives and variations which have been discussed above and all equivalents thereto.

What is claimed is:

1. Digital video tape recording apparatus of the type having block segmenting means for converting a vertical interval of picture data into image blocks of digital picture element data, compression encoding means for compressing the blocks of digital picture element data and generating a compression code representative thereof and recording means for recording said compression code on said magnetic tape, said apparatus comprising: selectable tape drive means for driving said magnetic tape at first or second speeds for recording said compression code, said second speed being approximately 1.5 times faster than said first speed; and first and second rotatable transducer means disposed approximately 180° apart and coupled to said recording means each for recording said compression code when said tape is driven at said first speed and when said tape is driven at said second speed each of said transducer means having a recording gap length for recording a track pitch, said gap length being at least equal to the track pitch recorded by said transducer means when said tape is driven at said second speed, and said first and second transducer means having respectively different azimuth angles.

2. The apparatus of claim 1 wherein said first and second transducer means record adjacent tracks, without guard bands therebetween, when said tape is driven at said second speed.

3. The apparatus of claim 1 wherein said compression encoding means includes an orthogonal transform encoder.

4. The apparatus of claim 3 wherein said orthogonal transform encoder is a discrete cosine transform encoder.

5. The apparatus of claim 1 wherein said recording means includes a channel encoder for encoding said compression code for recording.

6. The apparatus of claim 5 wherein said channel encoder comprises an adaptive scrambling circuit.

7. The apparatus of claim 6 wherein said adaptive scrambling circuit comprises M scrambling circuits.

8. The apparatus of claim 1 wherein said vertical interval of picture data comprises a field of luminance and color difference signals.

9. The apparatus of claim 1 wherein said vertical interval of picture data comprises a frame of luminance and color difference signals.

10. The apparatus of claim 1 wherein each of said first and second transducer means records a track pitch of 6 $\mu$m when said tape is driven at said first speed and a track pitch of 9 $\mu$m when said tape is driven at said second speed.

11. The apparatus of claim 1 wherein the recording gap length of each of said first and second transducer means is approximately 9 $\mu$m.

* * * * *